No. 861,037. PATENTED JULY 23, 1907.
R. KUBELKA.
SLEIGH ATTACHMENT FOR VEHICLES.
APPLICATION FILED MAR. 12, 1907.

2 SHEETS—SHEET 1.

WITNESSES
INVENTOR
Rudolf Kubelka
Attorney

No. 861,037. PATENTED JULY 23, 1907.
R. KUBELKA.
SLEIGH ATTACHMENT FOR VEHICLES.
APPLICATION FILED MAR. 12, 1907.
2 SHEETS—SHEET 2.
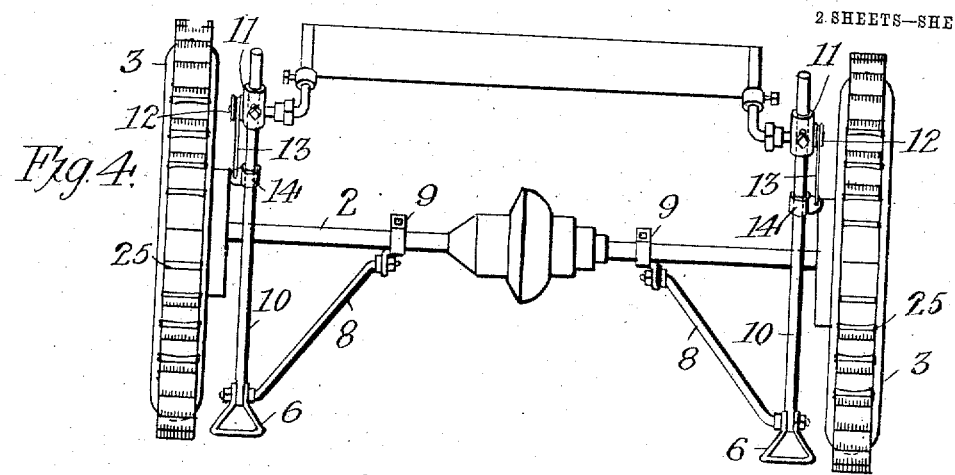
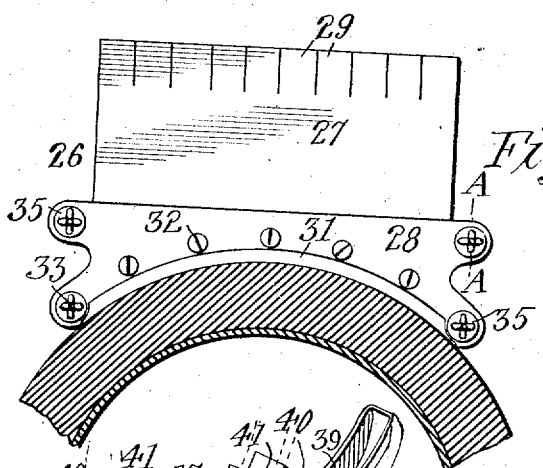
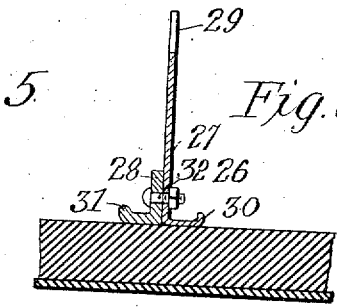
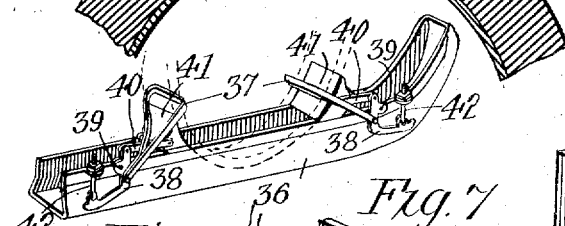
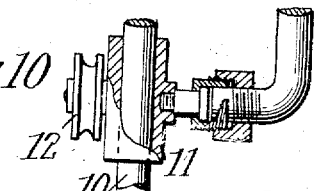
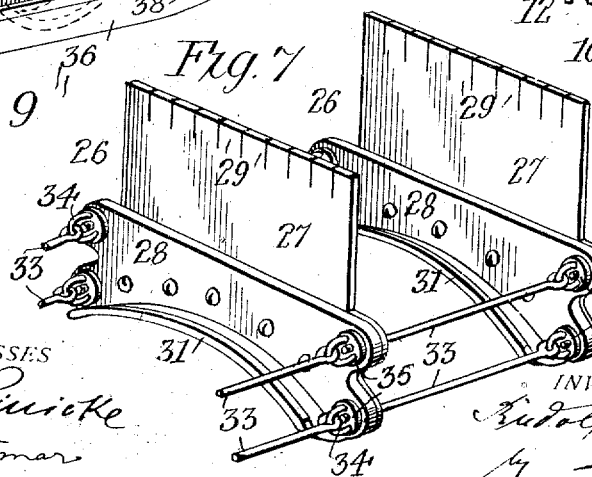
WITNESSES
Geo. Heinicke
F. Dittmar
INVENTOR
Rudolf Kubelka
by G. Dittmar
Attorney

UNITED STATES PATENT OFFICE.

RUDOLF KUBELKA, OF WASHINGTON, DISTRICT OF COLUMBIA.

SLEIGH ATTACHMENT FOR VEHICLES.

No. 861,037.   Specification of Letters Patent.   Patented July 23, 1907.

Application filed March 12, 1907. Serial No. 362,062.

*To all whom it may concern:*

Be it known that I, RUDOLF KUBELKA, a subject of the Emperor of Austria, residing at Washington, in the District of Columbia, have invented certain new and useful Improvements in Sleigh Attachments for Motor and other Vehicles, of which the following is a full, clear, and exact specification.

My invention relates to sleigh attachments for motor and other vehicles. Its object is to provide suitable devices whereby a motor or other wheeled vehicle can be readily converted into a sleigh.

Broadly stated, it consists of runners suspended from a vehicle and adapted to be brought, when desired, by suitable mechanism into operative contact with the ground; it is also consisting of a traction device operated by the power driven wheels; and it consists further of runners adapted to be placed under the wheels which are not power driven.

The details of construction for accomplishing the foregoing and hereinafter disclosed objects is described in the following description, pointed out in appended claims, and illustrated in the accompanying drawings in which—

Figure 1:
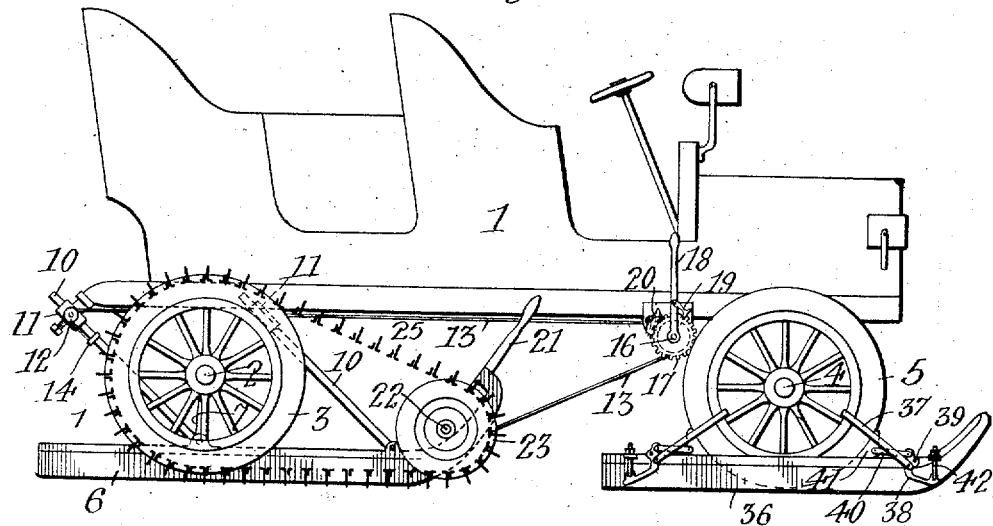
Figure 2:
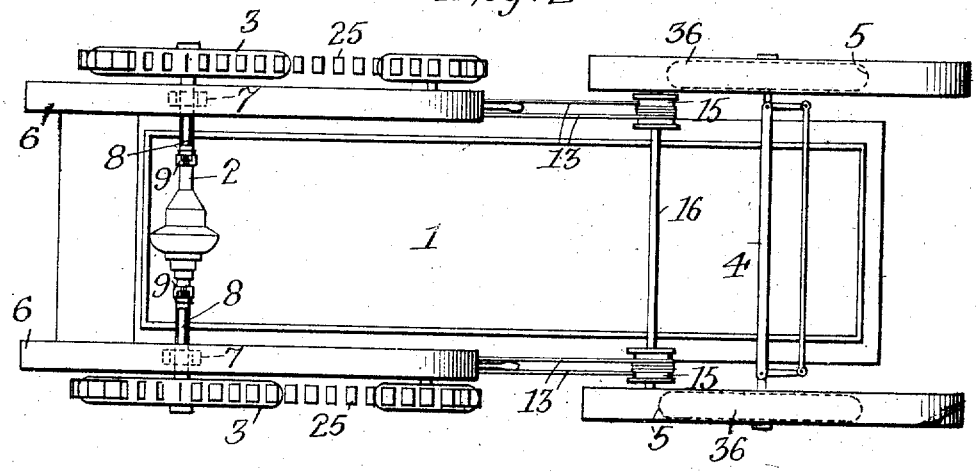
Figure 3:
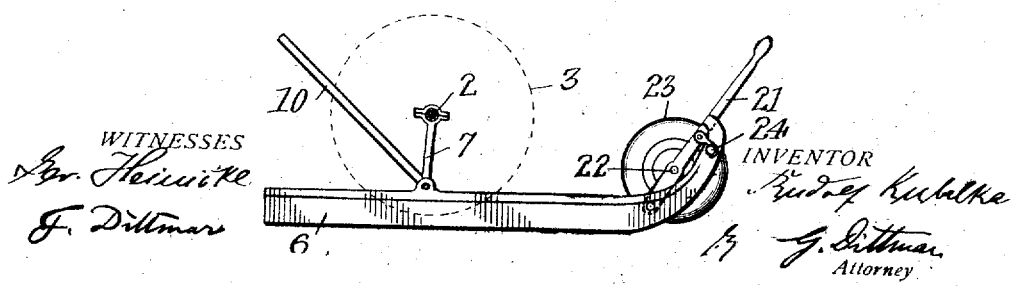

Figure 1 is a side elevation of a motor vehicle equipped with the invention and shown in operative position for use as a sleigh. Fig. 2 is a bottom plan view of the vehicle shown in Fig. 1. Fig. 3 is a detail of one of the rear runners. Fig. 4 is a rear view of a motor vehicle showing the rear runners suspended from the casing of the power axle. Fig. 5 is an elevation of one of the links of the traction chain, showing it in position upon the rim of the vehicle wheel. Fig. 6 is a transverse section of Fig. 5. Fig. 7 is a perspective view of a portion of the traction chain. Fig. 8 is a detail section on the line A—A Fig. 5. Fig. 9 is a detail of one of the runners to be used under a wheel that is not power driven. Fig. 10 is a detail of the swivel sleeve in which the parallel rod slides.

1 indicates a motor vehicle, 2 its power axle, 3 the traction wheels thereon, 4 the steering axle and 5 the wheels carried thereby. Rear runners 6 are pivotally suspended, by means of rods 7, to the casing of the power axle of the vehicle. Diagonally disposed brace rods 8 are pivotally attached to the runners at the point of the pivotal connection thereto of the rods 7, the upper ends of the rods 8 being also pivotally connected to a clip 9 which is fixed to the outer casing of the power axle. Parallel rods 10, are pivotally connected to the runners 6, and are telescopically supported in swivel sleeves 11 carried by the frame of the vehicle. Set-screws threaded into the sleeve 11 hold the rods 10 in position therein after adjustment. The rear swivel at each side of the vehicle, has mounted thereon a pulley 12 over which runs a cable 13, secured at one end, by a clip 14, to the rear parallel rod, the cable passing from the pulley 12 around a drum 15, fixed to a shaft 16, and from this drum the cable passes, and is attached to the forward end of a rear runner 6.

The shaft 16 is provided at each end with a drum 15, and at one end it has secured to it, a ratchet wheel 17, adapted to be actuated by a ratchet-lever 18 mounted loosely upon the shaft 16. The lever 18 carries a reversible pawl 19, and a reversible locking pawl 20 is also provided to hold the shaft in position after rotation.

The forward end of each rear runner has pivoted thereto a lever 21. This lever carries a spindle 22 on which is revolubly mounted a wheel 23 having a rim of similar cross-section to that of the wheels on the power axle. The position of the wheels 23 can be changed by means of the oscillation of their carrying levers 21, each of which is provided with a latch which engages a pin 24 secured to each of the runners 6. A traction chain 25 connects each of the driven wheels of the power axle to a correspondingly positioned wheel 23 carried by a runner 6. The chain 25 is composed of sections 26, each of which comprises a blade 27 and a reinforcing plate 28. The blade 27 is slit to form tongues 29 and is formed with a base curved to conform to the contour of the cross-section of the tires of wheels 4 and 23, the base being formed with a flange 30 to increase its bearing surface on the tires of the wheels. The plate 28 is formed with a flange 31, and is secured to the blade 27, by bolts 32. This plate acts as a reinforcement to the blade 27 to prevent the bending of the latter when it contacts with the ground. The sections 26 of the chain 25, are united by rods 33 formed at one end with a hook, and screw-threaded at the other end. The hooks of the rods 33 engage ring-bolts 34, provided with screw-threaded shanks 35, which pass through openings in the blade 27 and plate 28. The screw threads on the ring-bolts and on the contiguous ends of the rods 33 are oppositely inclined and each couple composed of a ring-bolt and a rod are united by means of a nut having right and left threads. A nut as shown in Fig. 8 secures each ring bolt to its section 26. The runners 36 for the steering wheels 5, are approximately U-shaped in cross-section. They are secured to the wheels by means of straps 37 which embrace the rim of the wheel. These straps are pivotally connected to a lever 38, which is pivoted at 39 to a runner 36. The lever 38 has also pivoted to it a link 40, the latter being pivoted to a block 41 adapted to be forced into engagement with the tire of a wheel by the same movement of the lever 38 that tightens the strap 37 about the rim. The lever 38 is provided with a pivoted screw-bolt 42 which projects through an ear on the runner and is retained in any adjusted position by a nut which engages the screw-bolt and rests upon the ear.

When the vehicle is being used in the ordinary manner, the forward runners are carried in the body of the vehicle, and the rear runners are swung up out of contact with the ground, the parallel rods 10 being retained in an elevated position by the set-screws of the sleeves 11.

When it is desired to use the vehicle as a sleigh, the forward runners 36 are first placed upon the ground, and the vehicle is then propelled forward carrying the tires of the steering wheels into the channeled recess of the runners. The latter are then firmly secured by means of the strap 37 and block 41 as will be readily understood. The set-screws in the swivel sleeves 11 are next withdrawn from engagement with the parallel rods 10 and the drums 15 are rotated to draw forward the cables attached to the forward end of the rear runners 6. The resultant forward movement of these runners causes them to oscillate downwardly about the power axle from which they are pivotally suspended, by the rods 7 and 8, approaching a vertical, lift the rear portion of the vehicle, thus lifting the wheels 3 from contact with the ground. The traction chain 25 is now placed on the power wheels 3 and the companion wheels 23, the latter being then moved into position to place suitable tension on the chain 25, and to bring its blades 27 into tractional contact with the ground. The parallel rods 10 are next secured in their adjusted position by means of the set-screws in the sleeves 11 and the vehicle is then arranged to run as a sleigh. As the motive power is now applied to the power axle, the latter rotates, thus rotating the wheels 3, which actuate the traction chain 25, the blades 27 of which taking into the snow or contacting with the ice lying upon the ground propel the vehicle along on its runners. When the use of the vehicle as a sled is no longer desired, the forward runners can be removed, the set-screws in the sleeves 11 loosened, and the drums 15 rotated to draw forward the cable attached to the parallel rods 10, which are thus drawn into an elevated position, carrying the rear runners out of contact with the ground thereby letting the vehicle again rest upon its wheels. The parallel rods are now secured in their adjusted position by the set screws of the sleeves 11 and the vehicle is ready for its ordinary use.

If desired the single cable attached to the parallel rods 10 and to the runners 6, could be replaced by separate cables, each having its own drum which could be of different diameters if found expedient.

Having thus described my invention, what I claim is:

1. In a vehicle of the class described, the combination with runners pivotally suspended from the vehicle, of parallel rods pivoted to the runners and slidingly engaging the frame of the vehicle, and means for oscillating the runners into and out of engagement with the ground.

2. In a vehicle of the class described, the combination with runners, of rods pivotally suspending the runners from the power axle, parallel rods pivoted to the runners, swivel sleeves carried by the frame of the vehicle and adapted to adjustably support the parallel rods, cables secured to the runners and to the parallel rods, rotatable drums adapted to operate the cables, a wheel adjustably carried by each runner, and a traction chain passing over the wheel carried by a runner and also passing over a corresponding driven wheel on the power axle.

3. In a vehicle of the class described, the combination with rear runners, of a suspending rod and a brace rod pivotally connected to each runner and also pivotally connected to the power shaft of the vehicle, swivel sleeves carried by the frame of the vehicle, parallel rods, pivotally connected to the runners and slidingly engaging the swivel sleeves means for holding the parallel rods in an adjusted position in the swivel sleeves, a cable secured to a parallel rod of each runner and also secured to each runner, a shaft, drums fixed to the shaft and controlling the cables, means for rotating the drum-carrying shaft, a traction chain connecting a wheel carried by a runner with a corresponding driven wheel on the power axle, and forward runners adapted to receive the steering wheels and to be removably secured thereto.

4. A runner having a channeled cross-section, an operating lever pivoted thereto, a strap pivoted to the operating lever and adapted to engage a wheel, a link pivoted to the operating lever, a block, pivoted to the link, and means for holding the operating lever in an adjusted position.

5. A traction chain having sections detachably connected by rods and nuts, each section comprising a plate slit to form tongues, and a reënforcing plate secured to the tongue plate, both plates being shaped to the contour of a tire of a wheel.

In testimony whereof I affix my signature.

RUDOLF KUBELKA.

In the presence of—
GEO. HEINICKE,
G. DITTMAR.